June 18, 1963
L. E. FRANCE
3,093,992
LATCH MECHANISM
Filed Dec. 5, 1960
3 Sheets-Sheet 1
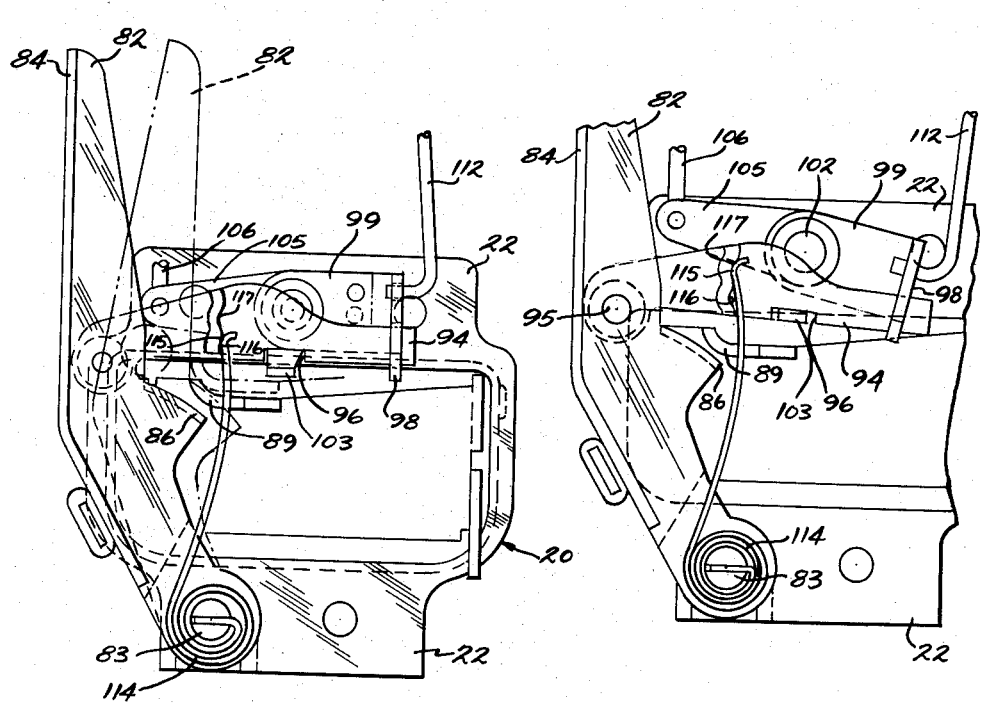
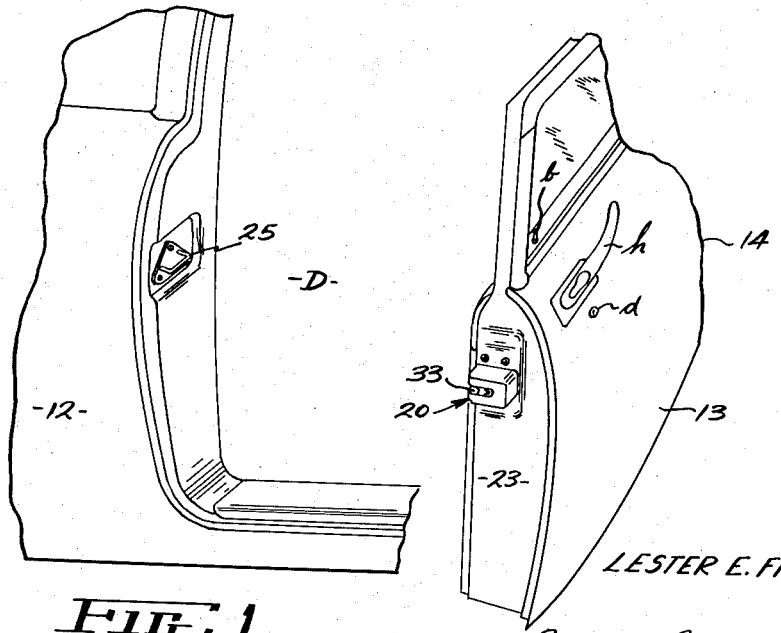
INVENTOR
LESTER E. FRANCE
BY Meyer, Baldwin, Doran & Young
ATTORNEYS

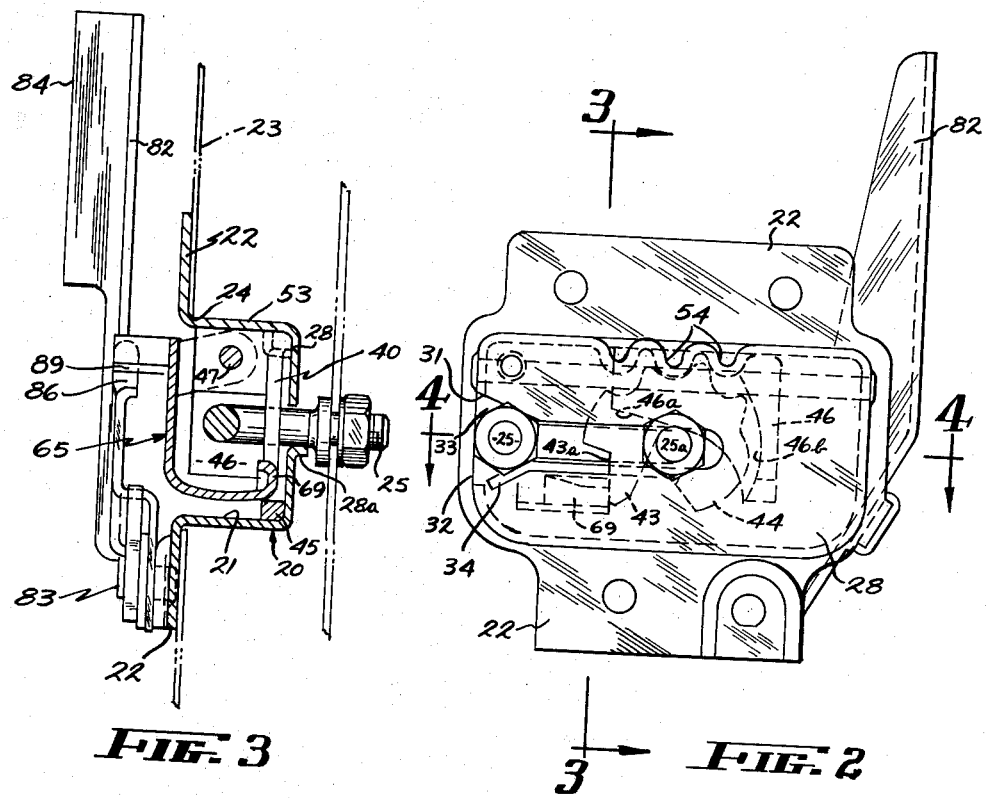
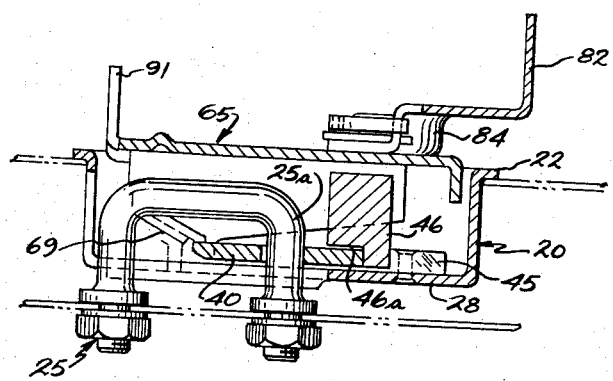

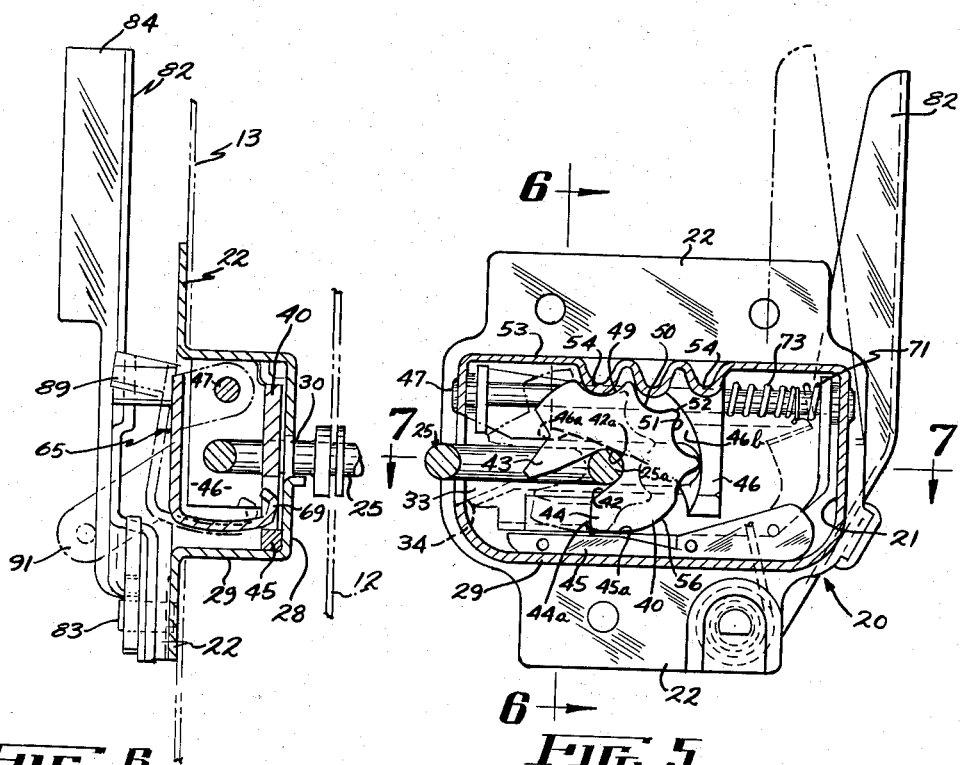
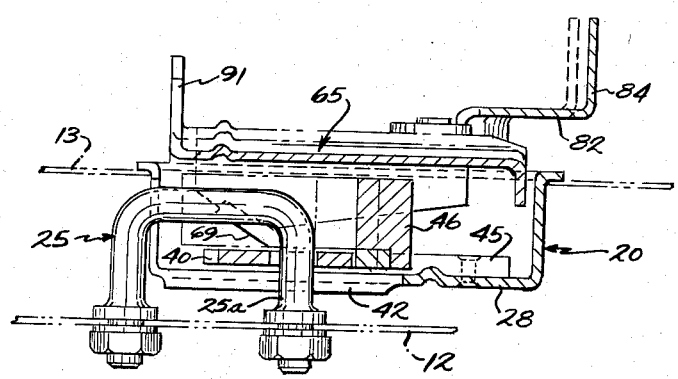

United States Patent Office 3,093,992
Patented June 18, 1963

3,093,992
LATCH MECHANISM
Lester E. France, Columbia Station, Ohio, assignor to The Standard Products Company, Cleveland, Ohio, a corporation of Ohio
Filed Dec. 5, 1960, Ser. No. 73,772
15 Claims. (Cl. 70—146)

This invention relates to a new and improved latch mechanism for two relatively movable structures, and more particularly to a latch mechanism especially designed for use in automotive vehicles and the like for latchably securing the vehicle door and/or doors to the body thereof.

A primary object of the present invention is the provision of a new and improved latch mechanism for two relatively movably structures, and which mechanism includes a keeper member for attachment to one of the said structures and a latch member for attachment to the other of said structures, said latch member being rollably actuatable by the keeper member in response to relative movement between said structures into retaining engagement with said keeper member effective to latchably secure said members together.

Another object of the present invention is the provision of a new and improved latch mechanism especially designed for use with automotive vehicles and the like, and which is especially designed to latchably secure the door and/or doors of said automotive vehicle to its body, said mechanism including a keeper for attachment to the vehicle body and a latch member for attachment to the door of the said vehicle, said latch member being rollably actuatable by the keeper in response to closing movement of said door to said body said latch member being moved thereby in a latching direction into retaining engagement with said keeper, said mechanism also including means for releasably detaining said latch member in its keeper retaining position, and means for actuating said detaining means, with consequent movement of said latch member to an unlatching position to thereby release said keeper and enable movement of said door to an open position relative to said vehicle body.

Another object of the present invention is the provision of a new and improved latch mechanism especially designed for use with automotive vehicles and the like for latchably securing the door and/or doors of said assembly to the vehicle body, and wherein said latch mechanism includes a keeper member for attachment to one of said vehicle members, a latch member for attachment to the other of said vehicle members, said latch member being actuatable by the keeper member as the door of said vehicle is moved toward a closed position relative to said body, said latch member being rollably actuated thereby into latching engagement with said keeper.

Still another object of the present invention is the provision of a new and improved latch mechanism especially designed for use with automotive vehicles and the like, and wherein said latch mechanism includes a keeper member for attachment to the body of said vehicle and a latch member for attachment to the door of said vehicle, and wherein as said door is movable toward a closed position with respect to said vehicle body, said latch member is rollably actuated by said keeper member in a latching direction and into retaining engagement with said keeper member, detent means for releasably detaining said latch member in its keeper retaining position, lock means for locking said latch member in its keeper retaining position and manually controlled means for actuating said lock means and said detent means, with consequent rolling movement of said latch member to thereby release the keeper member and enable said door to move to an open position with respect to said body.

Another object of the present invention is the provision of a new and improved latch mechanism especially designed for use in automotive vehicles and the like, and wherein said latch mechanism includes a keeper member for attachment to the body of said vehicle and a latch member for attachment to the door of said vehicle, and wherein as said door is movable toward a closed position with respect to said vehicle body said latch member is rollably actuated by said keeper member in a latching direction and into retaining engagement with said keeper member, detent means for releasably detaining said latch member in its keeper retaining position, lock means for selectively locking said latch member from outside of and/or inside said vehicle body in its keeper retaining position, and manually controlled means for actuating said lock means and detent means outside of and/or inside said body, with consequent rolling movement of said latch member to thereby release said keeper member and enable said door to move toward an open position with respect to said vehicle body.

Additional objects and advantages of the latch mechanism of the present invention will be realized by one skilled in the art to which it pertains and upon reference to the following disclosure of a preferred embodiment thereof and which embodiment is illustrated in the accompanying drawings wherein;

FIG. 1 is a fragmentary perspective view of an automotive vehicle showing the adaptation of latch mechanism embodying the present invention to the front door casement and associated right-hand front door casement of said vehicle;

FIG. 2 is a front elevational view with the components of the latch mechanism is fully latched or closed position;

FIG. 3 is a vertical sectional view taken on the plane as is indicated approximately by the line 3—3 in FIG. 2;

FIG. 4 is a horizontal sectional view taken on the plane as is indicated by the line 4—4 in FIG. 2;

FIG. 5 is a front view of the latch mechanism with the base wall of the latch housing removed to more clearly illustrate the underlying assembly of the components thereof;

FIG. 6 is a vertical sectional view taken on line 6—6 of FIG. 5;

FIG. 7 is a horizontal sectional view taken on line 7—7 of FIG. 5;

FIG. 8 is a rear view in elevation showing particularly the locking means of the latch mechanism embodying the present invention; and, FIG. 9 is a fragmentary rear view similar to FIG. 8 and showing the locking means in its locking position with said latch mechanism.

Briefly, the latch mechanism of the present invention, is herein shown merely for purposes of the present disclosure as adapted for use with an automotive vehicle such as is shown in FIG. 1, said vehicle including a body 12 having one or more doors 13 hingably mounted thereto as shown at 14 and which are intended to be moved into and out of closing engagement with respect to associated door openings D thereof as formed on said body to thus provide ingress and/or egress to and from said vehicle.

For purposes of the present disclosure, the latch mechanism herein illustrated is the embodiment thereof especially designed for use on the right-hand vehicle door; however as will be hereinafter apparent the inventive concepts as herein disclosed are the same for the latch mechanism assembly for use with the left-hand vehicle door and/or doors.

The embodiment of latch mechanism of the present invention herein disclosed is intended to provide for latchably attaching the aforesaid vehicle door and/or doors 13 to the body of said vehicle, said latch mechanism having three distinct operable positions as will be hereinafter more fully described and likewise recognized by the artisan, and which are identified herein respectively as the "open," "safety," and "closed" positions for said mechanism.

In the aforesaid "open" position for said latch mechanism, the door and/or doors 13 of the vehicle are in an unlatched or open position with respect to the vehicle body 12 to thus provide for ingress and/or egress through the associated door openings D therefor to and from the interior of said vehicle. The respective positions occupied by the several components of the latch mechanism while the same is in said "open" position is herein shown in dotted lines in FIG. 5.

In the "safety" position of said latch mechanism, the door and/or doors 13 of the vehicle have previously been moved toward a fully latched or closed position with respect to the door openings D in the vehicle body 12 sufficiently to provide an initial actuation of said latch mechanism whereby said door and/or doors are prevented from being thereafter inadvertently swung to an open position without first releasing the said door from said latched or safety position, which thus prevents the occupants of said vehicle, for example small children, from inadvertently opening said door and/or doors and falling out of the vehicle with consequent injurious resuits. The respective location for the several components of the latch mechanism in this "safety" position therefore is herein depicted in solid lines in FIG. 5.

In "closed or fully latched" position, the door and/or doors 13 of the vehicle have previously been moved to a fully closed position with respect to the associated door openings on the vehicle body 12, said latch mechanism being actuatable in response to the relative movement of said doors to said body to retain the former in a fully closed position. The respective locations of the several components of the latch mechanism in said "closed or fully latched" position is herein depicted in FIG. 2.

As will be hereinafter more fully explained, the instant latch mechanism is also provided with means for locking the aforementioned several components of the mechanism while the same are in either a "safety" and/or a "closed or fully latched" position thereby preventing inadvertent operation thereof to an open position until said locking means have been actuated to an unlocked position, said locking means being illustrated in unlocked and locking positions respectively in FIG. 8 and 9.

With reference now directed to the drawings, the latch mechanism of the present invention is seen to include a housing or casing 20 being preferably somewhat box-like in configuration to thus define a latch chamber 21 therein, said housing having outwardly projecting mounting flanges 22 to provide for attachment of the same to the vertical shut or jamb face of the door frame 23 opposite the aforesaid hinge connection 14 therefor.

It is preferred to have the door frame apertured as indicated at 24 and to dispose the housing 20 therein so that it projects outwardly therethrough the mounting flanges of the latter thus abutting the inside face of said shut face with the rear open end of said housing communicating with the interior of the door.

The instant latch mechanism also includes a keeper member as is identified by the reference character 25, and which is seen to be preferably U-shaped in configuration, being formed of a suitable round rod so as to provide a smooth exterior surface therefor, the ends of said keeper member, as best seen in FIG. 1, being intended to be securely fastened on the vertical pillar defining the edge of the door opening D on the said vehicle body opposite the hinge connections 14 for the door so as to project outwardly therefrom and in position to be in operative association with the latch components disposed in the aforesaid housing 20.

As best seen in FIGS. 5 and 6, the box-like housing 20 is preferably rectangular in configuration and is intended to be mounted to the aforesaid door frame 23 with its longer sides extending approximately in the same direction the door 13 associated therewith is intended to swing.

The base wall 28 of the housing 20 is seen to be provided with a passageway 30 which projects partially longitudinally therethrough and which communicates at its one end with a bell-shaped opening at 31 in the adjacent end wall as is herein identified by the reference numeral 32, said communicating passageway and opening thus defining a mouth 33 for said housing which, as will later appear, is intended to accommodate the entrance and ejection of the keeper member 25 into and from the latch chamber 21. As seen in FIG. 5, the aforesaid housing mouth 33 is preferably formed with outwardly diverging walls 34 to assist said keeper member 25 in accomplishing its aforementioned movements.

The instant latch mechanism also includes a latch member identified in its entirety by the reference numeral 40, and which is disposed in the latch chamber 21 of the housing 20 in an upright position on its peripheral edge and which is rollably actuated therein by and as the keeper member 25 engages the same while moving into and/or out of said latching chamber 21 while closing and/or opening the vehicle door, respectively.

The latch member 40 is plate-like in its construction, being somewhat C-shaped in configuration and is seen to have a channel 42 formed approximately centrally therethrough and terminating in a radius at its innermost end as identified at 42a, the center of the latter being disposed on the axis of said latch member and to thus define a pair of spaced arms 43 and 44 respectively.

A rail member 45 is disposed on the lower longitudinal side wall 29 of the housing 20 abutting preferably against the base wall 28 and formed with an upwardly facing guide surface 45a. If desired, the rail member 45 may be made integral with the housing 20.

In this upright position the latch member 40 is intended to be rolled partially through the latch chamber 21 from left to right rotating in a counterclockwise direction whereby the latch member arm 43 is carried over and behind said leading leg 25a of the said keeper member, said leg also being hereinafter referred to as the latching leg of said keeper member and likewise acting as an axle about which the latching member rotates as it rolls through said chamber.

As will be recognized, when the leading leg 25a of the keeper 25 engages the closed radial end 42a of the channel 42, the latch member 40 then partakes of a rotational movement about said leg 25a, the latter as will be recalled being stationary with the vehicle body. The door 13, continuing in its closing movement thus carries the housing 20 therewith whereby the housing movement relative to the keeper member 25 causes the rotating latch member to rollably advance therethrough from left to right as is above mentioned.

The configuration of the channel 42 is such as to slidably accommodate the leading leg 25a of the keeper member 25 while the marginal edge of its radial portion 42a engages the surface of said leading leg to thereby provide vertical support for the door as it moves toward its closed position.

To accomplish the aforedescribed rolling movement of the latch member 40, the periphery of the latter remote from the channel 42 is provided with a series of spaced grooves each being identified respectively by the reference numerals 49, 50 and 51, said grooves as best seen in FIG. 5 being spaced one from the other along a curved portion of the periphery of said latch member, defining a series of spaced teeth 52 therebetween and thereby approximating a curved gear sector thereon.

The upper longitudinal side wall 53 of the housing 20 is seen to be formed with a corresponding number of spaced detents 54, the latter projecting downwardly and into the latch chamber 21 in close juxtaposition to the base wall 28 of said housing and directly over the aforementioned guide surface 45a to thus define a rack on said wall.

The latch member, as heretofore mentioned, is rollably moved through the latch chamber 21 by the keeper member 25 as the door is moved toward its closed position with respect to its door opening first to the aforementioned "safety" position therefor. The periphery of the latch member beginning at the outermost end of its arm 44 and extending rearwardly therefrom or to the right toward the aforesaid gear sector as viewed in FIG. 5 is likewise preferably arcuate in configuration to thus define a smooth continuous surface as is identified herein by the reference numeral 56 and which is seen to ride upon the upper flat surface 45a of the rail member 45 as it moves therealong.

With this assembly, as the latch member 40 is rolled through the latch chamber 21 from its "open" to its "safety" position, rotating about the leg 25a of said keeper member, its arcuate surface 56 slides over the underlying surface 45a of said rail member and the gear sector therein advances or tracks over the aforementioned rack, the dimensions of the instant latch member being such that the groove 49 accommodates the detent on the left end of said gear rack when in said safety position.

The instant latch mechanism is also provided with means now to be described which function to releasably retain the latch member 40 in either its "safety" position and/or its "closed" position. For this purpose, a pawl member, as is identified in its entirety by the reference numeral 65, and which is seen to be substantially channel-shaped in overall configuration is mounted at its ends upon said rod 47, the latter being pivotally suspended between the end walls of the housing 20 and extending longitudinally therethrough, said pawl member having a pawl or detent 69 integrally formed with its one side and extending outwardly therefrom. Said pawl member is thus mounted upon the aforesaid rod 47 so as to locate its pawl or detent 69 against the inside surface of the latch member arm 44 with the latch member disposed in its "open" position.

The pawl member 65 is spring biased so as to urge its pawl or detent 69 against said latch member, and for this purpose, a spring 71 is disposed on the rod 47, its one end being connected to the housing 20 and its opposite end attached to the said pawl member 65. In this manner, the pawl member 65 is biased in a counterclockwise direction as viewed in FIG. 6 so as to urge the pawl or detent 69 thereof toward the housing base wall 28 and into pressure engagement with the latch member 40 interposed therebetween.

As previously mentioned, with the latch mechanism in its "open" position, the latch member 40 is disposed so that its arm 44 is interposed between the base wall 28 of the housing 20 and the aforementioned pawl or detent 69. Thereafter, as the door 13 is swung toward its closed position, to bring the keeper member 25 into engagement with the latch member 40 whereby the latter is rollably moved through the latch chamber 21 to its "safety" position, said latch member arm 44 as best seen in FIG. 5, is moved to the right and out from under said pawl. As a result, the pawl member 65 swings its pawl into engagement with the housing base wall and in front of the rear edge 44a of said latch member arm 44, being thus effective to retain said latch member in said "safety" position.

The guide block or wedge 46, as is aforementioned, is slidably mounted on the rod 47 and is biased thereon toward the left end of the housing as viewed in FIG. 5 by a coil spring 73 carried on said rod.

In rollably actuating the latch member 40 to its "safety" position the leading leg 25a of the latch member 25 engages an inclined face 46a formed on the wedge 46 being thus effective to slide the latter along the supporting rod 47 against the pressure of spring 73. As will later appear in the "closed" position for the latch said spring pressure biases the keeper member leg 25a into positive engagement with the lower edge of the housing passageway which, in the instant embodiment is defined by a ledge 28a to provide vertical restraint for the door.

As will be recognized, with the leg 25a of the keeper member 25 disposed in the radial portion 42a of the channel 42 of the latch member and the aforesaid teeth of the latter in engagement with said rack and with said leg 25a engaging with the inclined surface 46a of this wedge, the associated door 13 is prevented from vertically oscillating about its hinge connections 14 while the same is moving toward its closed position.

With this assembly, it will also be seen that as the guide wedge 46 is moved with the latch member 40 to the "safety" position for the latter, whereby the coil spring 73 is compressed, an increasing back pressure is applied to said guide wedge which, when the latch assembly is actuated so as to open the door as will be later explained in detail, said wedge will assist in returning the latch member 40 to its "open" position. As will also be recognized, the pressure of the spring 73 in combination with the door seal urges the latch member into positive engagement with the pawl or detent 69.

With the latch member 40 thus rotatably actuated and moved through the latch chamber 21 to its "safety" position as just described, it will now be realized that the keeper member is thus detained in latched engagement with said latch member and thus prevented from becoming detached from the same whereby the door connected thereto is prevented from being inadvertently opened.

Under normal conditions, the vehicle door 13 is intended to be moved or slammed to its closed position with respect to its door opening D on the vehicle body, however it will now be understood that in the event such is not the case and the door is merely partially closed effective to initially actuate the latch mechanism to its "safety" position said door will thus remain in said position until the latch mechanism is actuated to return said latch member and door to their respective "open" positions.

With reference now directed particularly to FIGS. 2 and 4, as the door 23 continues or is subsequently moved toward its "closed" position, the latch member 40 is rollably moved longitudinally through the housing chamber 21, said movement actuating the latch member 40 from its FIG. 5 position as shown in solid lines to its FIG. 2 position whereby the arm 43 of said latch member is carried through the center opening of the U-shaped keeper member 25, the leg 25a of said latch member as aforementioned acting as an axle about which the said latch member rotates, said movement carrying said latch member arm 44 toward and into engagement with the pawl or detent 69 of the pawl member 65. Said pawl 69 is seen to be inclined outwardly away from the housing base wall 28 to thereby permit said latch member arm 44 to enter between said inclined surface and said base wall, whereby, in its continued rollable movement, said latch member is thus effective to swing the pawl member 65 clockwise as viewed in FIG. 6 and thus permit said latch member arm 43 to move therepast. As best seen in FIG. 2 as the latch member arm 43 moves past the pawl 69, said pawl member is pivoted under the influence of its spring 71 so as to move the pawl 69 in front of the rear edge 43a of the arm member 43 being thus effective to retain the latch member 40 in its "closed" position.

As is also shown in FIG. 2, the latch member 40 is likewise intended to have a certain degree of overtravel, from its "closed" position as will be understood by the artisan, to thus accommodate for various differences in the alignment and/or manufacturing tolerances of the latch mechanism and the aging of the door seals normally disposed on the periphery of the same.

The latch mechanism of the present invention is also intended to provide for its manual actuation from the outside and/or inside of the vehicle. To provide for actuating said latch mechanism from the outside of the vehicle door 13, the embodiment of latch mechanism disclosed herein is seen to include an actuating lever 82 pivotally anchored at its one end by pin 83 to the housing 20, and which is seen to have an actuating flange portion 84 formed on its opposite end, and which flange portion is intended to be engageable with any conventional lever mechanism (not herein shown) which in turn is connectable to a manually operable handle *h* carried on the exterior of the door as will be understood, said actuating lever 82 being thus swingable in response to the operation of said exteriorly located mechanism in a clockwise direction as viewed in FIG. 8.

A cam 86 is seen to be formed on said actuating lever 82, intermediate the ends thereof, and which is intended to operatively cooperate with a cam 89 formed on the aforesaid pawl member 65 to the left of its pivot as viewed in FIG. 6 being thus effective to swing said pawl member in a clockwise direction about its pivot rod 47 whereby the pawl 69 carried thereon is moved away and out of engagement with the latch member arm 43. Thereafter, the latch member 40 is free to rollably actuate toward the mouth 33 of the passageway 30 being urged by the pressure exerted by the spring 73 on wedge 46 thereby allowing the keeper member 25 to have a substantially clear passage for disengagement from the same to thus allow the door 13 to be swung to its open position.

The wedge 46 is also seen to be preferably formed with a curved surface 46*b* which surface is intended to engage the latch member and to assist in moving the same to and retaining it in its said "open" position.

In the open position for the vehicle door, the pawl member 65, as is aforementioned, is engageable with the rear face of the latch member 40 whereby the cam 89 thereon is located closely adjacent the marginal edge of locking lever 94 thus preventing the latter from being moved to its locked position.

For actuating the latch mechanism from the inside of the vehicle body, the pawl member 65 is provided with a lever 91, said lever is intended to be connected to any conventional inside actuating mechanism (although not herein shown) for the door whereby it is capable of causing the pawl member to be swung about its pivot rod 47 clockwise as is viewed in FIG. 6. This movement causes locking lever 94, if previously locked, to be moved to its unlocked position coincident with opening the door as in the previous case of actuating the door from the outside of the vehicle body and is likewise intended to cause the pawl or detent 69 on said pawl member 65 to be removed from engagement with the latch member arm 43 thus permitting the latch member to be rollably actuated toward the mouth of the passageway 30 in the housing 20 whereby the keeper member 25 is permitted to move out of the latching chamber in said housing and to thereby enable the aforesaid door to be swung to its open position.

As previously mentioned, the coil spring 73 mounted on the rod 47 is operative to bias the guide block or wedge 46 which, in turn, biases the latch member 40 toward the mouth 33 of the opening in passageway 30. With this assembly it will also be seen that this spring bias, as thus applied, tends to propel the keeper member 25 out of the housing whereby the vehicle door is automatically moved toward its open position.

The instant latch mechanism is also provided with locking means which are operable to lock the latch mechanism in its "safety" or "closed" position from either outside of and/or inside the vehicle body.

For this purpose, a locking lever 94 is seen to have its one end pivotally secured at 95 to the outside actuating lever 82 for the said latch mechanism, its opposite end being slidably disposed within a depending arm 98 of a link element 99, the latter being pivotally mounted at 102 to the housing 20. The locking lever 94 is seen to be provided with a recess 96 intermediate its ends and which faces a tab 103 preferably struck upwardly from the housing 20.

The locking lever 94 has basically two operative positions; in its unlocked position as is herein shown in FIG. 8, said lever is spaced above the aforesaid tab 103 whereby as the exterior actuating lever 82 is moved in the manner as above described to actuate the latching mechanism pursuant to opening the door, the locking lever 94 being suspended between the latter and the depending arm 98 of the link element 99 moves across and above said tab during the interval of said actuation.

In its "locking position," the lever 94 is pivotally swung about the actuating lever 82 sufficient to lodge the tab 103 within the recess 96 thereon. In this position, the engagement between said tab and the marginal edge of the locking lever defining said recess prevents the actuating lever 82 from being moved to its latch actuating position. Consequently, said mechanism may be locked in its latched position which, as is hereinabove mentioned, may be either in the "safety" and/or "fully latched or closed" position only for said latch mechanism.

A spring member 114 carried on pin 83 has its one end connected to said housing and its opposite end disposed adjacent the locking lever 94 and formed with a protuberance 115. Said locking lever 94 is likewise formed with a pair of spaced detents 116 and 117. In the "unlocked position" for said lever, the protuberance 115 of said spring is disposed in the detent 116 and thus operable to retain said lever in its "unlocked" position.

When the locking lever 94 is moved to its "locked" position, the spring protuberance is intended to be disposed in detent 117 on said lever to thus retain the same in its "locking position." The spring 114 is also operable to urge the lever 82 in a counterclockwise direction as viewed in FIG. 8 to its unactuated position.

To lock the instant latch mechanism from the exterior of the vehicle body, for example with a key or the like, the link element 99 is seen to be integrally formed with an arm 105 extending outwardly from its pivot 102 in substantial longitudinal prolongation thereto, said arm in addition, being linkably connected at 106 to a conventional key cylinder *d* in a manner as is well known in the art. Upon actuating the lock to its locked position said arm 105 is intended to be pivoted clockwise as viewed in FIG. 9 about said pivot 102 to thus carry the link arm 98 downwardly and move the locking lever 94 clockwise so that its recess 96 accommodates the aforesaid tab 103 to thereby lock said latch mechanism in its "safety" or "fully latched-closed" position.

To lock the latch mechanism from the interior of the vehicle, the link element 99 is attached by a suitable connecting rod 112 to a conventional button actuator *b* which is normally located on the inside of the door as is well known, and which, upon being depressed, is intended to swing the link element 99 and connected lever 94 in its locking position with the aforesaid tab 103 as is aforementioned to thereby lock said latch mechanism.

With this assembly, it will be seen that upon actuating either the exterior key cylinder or interior button actuator so as to swing the locking lever 94 to its unlocked position, the link element 99 is likewise swung upwardly as viewed in FIG. 8, to thereby move the other locking actuator, that is the button actuator or key cylinder to its unlocked position.

As will be recognized by the artisan, the latch assembly as above described is especially designed for use with the front doors of an automotive vehicle wherein it is desirable to lock said doors from either the outside or inside of the said vehicle. In adapting the instant latch assembly to a rear door of said vehicle wherein the said rear door is not normally locked with a key from the outside, the locking lever 99 is merely connected through linkage 112 to the button actuator whereby the lever may be locked from inside the vehicle.

Having described a preferred embodiment of latch mechanism of the present invention it is to be understood that the same is susceptible to various changes, modifications and combinations of parts without departing from the inventive concepts as are defined in the appended claims.

What is claimed is:

1. Latch mechanism for two relatively movable structures, said latch mechanism comprising a keeper for attachment to one structure, a casing for attachment to the other of said structures, said casing having a passageway into and out of which the keeper is adapted to move upon relative movement of said structures, a latch member, means for rollably mounting said latch member adjacent said passageway, said latch member being actuatable by the keeper as the latter enters into said passageway and rolled thereby through said casing in a latching direction and into retaining engagement with said keeper, detent means for releasably detaining said latch member in its keeper retaining relation, and means for actuating said detent means, with consequent rolling movement of said latch member to thereby release the keeper and permit relative movement of said structures.

2. Latch mechanism for two relatively movable structures, said latch mechanism comprising a keeper for attachment to one structure, a casing for attachment to the other of said structures, said casing having a passageway into and out of which the keeper is adapted to move upon relative movement of said structures, a latch member, means for rollably mounting said latch member adjacent said passageway, said latch member being rolled by the keeper through said casing as said keeper enters into said passageway and moved thereby in a latching direction into retaining engagement with said keeper, detent means for releasably detaining said latch member on its keeper retaining relation, means normally urging said detent means toward said latch member detaining position, and means for actuating said urging means effective to operate said detent means, with consequent rolling movement of said latch member to an unlatched position to thereby release the keeper and permit relative movement of said structures.

3. Latch mechanism for two relatively movable structures, said latch mechanism comprising a keeper for attachment to one structure, a casing for attachment to the other of said structures, said casing having a passageway into and out of which the keeper is adapted to move upon relative movement of said structures, a latch member having a latching arm, means for rollably mounting said latch member adjacent said passageway, said latch member being engageable with and rolled by the keeper through said casing as said keeper enters into said passageway and moved thereby in a latching direction to bring said latching arm into retaining engagement with said keeper, detent means for releasably detaining said latching arm in its keeper retaining relation, and means for actuating said detent means, with consequent rolling movement of said latch member to thereby remove its latching arm from engagement with said keeper and to permit relative movement of said structures.

4. Latch mechanism for two relatively movable structures, said latch mechanism comprising a keeper for attachment to one structure, a casing for attachment to the other of said structures, said casing having a passageway into and out of which the keeper is adapted to move upon relative movement of said structures, a latch member having spaced arms, means for rollably mounting said latch member adjacent said passageway, said latch member being rolled by the keeper as said keeper enters into said passageway and moved thereby through said casing in a latching direction to bring one of said spaced arms into retaining engagement with said keeper, detent means engageable with another of said spaced arms for detaining said one arm in its keeper retaining relation, and means for actuating said detent means so as to release said other latch member arm from engageable relation with said detent means, with consequent rolling movement of said latch member to thereby remove its one arm from retaining engagement with said keeper and to permit relative movement of said structures.

5. Latch mechanism for two relatively movable structures, said latch mechanism comprising a keeper for attachment to one structure, a casing for attachment to the other of said structures, said casing having a passageway into and out of which the keeper is adapted to move upon relative movement of said structures, a latch member having a pair of spaced arms, means for rollably mounting said latch member adjacent said passageway, said latch member being rolled through said casing to a first position by the keeper as said keeper enters into said passageway and moved thereby in a latching direction to bring one of said spaced arms into retaining engagement with said keeper, detent means being responsive to the rolling movement of said latch member to said first position to engage the other of said arms for detaining said one arm in its keeper retaining relation, said latch member being actuatable to a second position by said keeper and moved thereby in said latching direction to bring said one arm of said latch member into releasable engagement with said detent means, means normally urging said detent means into releasable engagement with said one latch member arm, and means for actuating said detent means so as to release said arm with consequent rolling movement of said latch member to thereby remove its said one arm from retaining engagement with said keeper and to permit relative movement of said structure.

6. Latch mechanism for two relatively movable structures, said latch mechanism comprising a keeper for attachment to one structure, a casing for attachment to the other of said structures, said casing having a passageway into and out of which the keeper is adapted to move upon relative movement of said structures, a latch member having a pair of spaced arms, means for rollably mounting said latch member in said casing adjacent said passageway, said latch member being rollably moved by said keeper in a latching direction through said casing to a first position as said keeper moves into said passageway and between said spaced arms effective to bring one of said arms into retaining engagement with said keeper, detent means and means movably mounting said detent means adjacent said latch member, said detent means being responsive to the movement of said latch member to said first position to move into engagement with the other of said latch member arms being operable thereby to detain said one arm in its keeper retaining relation, said latch member being rollably moved by said keeper through said housing in said latching direction to a second position, said keeper being in engagement with said latch member and operable therewith to define an axle about which said latch member is rotatable during said rollable movement, said detent means being responsive to the movement of said latch member to said second position to move into releasable engagement with said one arm of the latter, and means for moving said detent means out of engagement with said one arm, with consequent rolling movement of said latch member to thereby remove its said one arm from retaining engagement with said keeper and permit relative movement of said structures.

7. In latch mechanism for two relatively movable structures as is defined in claim 6, and wherein the means for rollably mounting the latch member in the casing includes a rack and gear means connection therebetween.

8. In latch mechanism for two relatively movable structures as is defined in claim 6, and wherein the means for rollably mounting the latch member in the casing includes guide means positioned so as to provide vertical restraint to said latch member as it moves to its first and second positions.

9. Latch mechanism for two relatively movable structures, said latch mechanism comprising a keeper for attachment to one structure, a casing for attachment to the other of said structures, said casing having a passageway into and out of which the keeper is adapted to move upon relative movement of said structures, a latch member having a pair of spaced arms, means for rollably mounting said latch member in said casing adjacent said passageway comprising a rack on said casing in meshing engagement with gear means on said latch member, said latch member being rollably moved by said keeper in a latching direction through said casing as said keeper enters said passageway into retaining engagement with said keeper, said latch member rollably moving along said casing and said gear means advancing along said rack, detent means for releasably detaining said latch member in its keeper retaining relation, and means for actuating said detent means, with consequent rolling movement of said latch member to thereby release the keeper and permit relative movement of said structures.

10. Latch mechanism for two relatively movable structures, said latch mechanism comprising a keeper for attachment to one structure, a casing for attachment to the other of said structures, said casing having a passageway into and out of which the keeper is adapted to move upon relative movement of said structures, a latch member having a pair of spaced arms, means for rollably mounting said latch member in said casing adjacent said passageway comprising a guide surface on said casing, a rack on said casing in meshing engagement with gear means on said latch member, said latch member being rollably moved by said keeper in a latching direction through said casing to a first position as said keeper enters into said passageway and between said spaced arms effective to bring one of said arms into retaining engagement with said keeper, said latch member rollably moving along in the direction of said guide surface and said gear means advancing along said rack, detent means and means movably mounting said detent means adjacent said latch member, said detent means being responsive to the movement of said latch member to said first position to move into engagement with the other of said latch member arms being operable thereby to detain said one arm in its keeper retaining position, said latch member being rollably moved by said keeper through said housing in said latching direction to a second position to move said one arm into releasable engagement with said detent means, and actuator means for moving said detent means out of engagement with said one latch member arm, with consequent rolling movement of said latch member to thereby remove its one arm from retaining engagement with said keepr and to permit relative movement of said structures.

11. In latch mechanism for two relatively movable structures as is defined in claim 10 and wherein cam means on said detent means are engageable by said actuator means and effective to move said detent means out of engagement with said one latch member arm.

12. In latch mechanism for two relatively movable structures as is defined in claim 10, and wherein lock means operatively engageable with said actuator means is effective to releasably lock said latch member in its said first position.

13. In latch mechanism for two relatively movable structures as is defined in claim 10, and wherein lock means operatively engageable with said actuator means is effective to releasably lock said latch member in its second position.

14. In latch mechanism for two relatively movable structures as is defined in claim 10, and wherein means normally urge the detent means into engagement with said latch member.

15. In latch mechanism for two relatively movable structures as is defined in claim 10, and wherein means in operative engagement with said latch member normally urge said latch member toward its keeper releasing position.

References Cited in the file of this patent

UNITED STATES PATENTS

| | | |
|---|---|---|
| 2,634,147 | Robertson | Apr. 7, 1953 |
| 2,767,571 | Dingman et al. | Oct. 23, 1956 |
| 2,795,947 | Peras | June 18, 1957 |
| 2,977,785 | Beckman | Apr. 4, 1961 |